(12) United States Patent
Kammerer

(10) Patent No.: US 10,336,342 B2
(45) Date of Patent: Jul. 2, 2019

(54) METHOD AND DEVICE FOR PROCESSING AT LEAST ONE PARAMETER OF A TRIP OR AN EVENT OF A VEHICLE FOR A VEHICLE

(71) Applicant: Robert Bosch GmbH, Stuttgart (DE)

(72) Inventor: Matthias Kammerer, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 37 days.

(21) Appl. No.: 15/628,619

(22) Filed: Jun. 20, 2017

(65) Prior Publication Data

US 2018/0022360 A1    Jan. 25, 2018

(30) Foreign Application Priority Data

Jul. 21, 2016    (DE) ........................ 10 2016 213 346

(51) Int. Cl.
*B60W 40/09* (2012.01)
*G07C 5/08* (2006.01)
*G07C 5/00* (2006.01)

(52) U.S. Cl.
CPC .............. *B60W 40/09* (2013.01); *G07C 5/008* (2013.01); *G07C 5/08* (2013.01)

(58) Field of Classification Search
CPC .......... B60W 40/09; G07C 5/008; G07C 5/08
See application file for complete search history.

(56) References Cited

U.S. PATENT DOCUMENTS

| | | | | |
|---|---|---|---|---|
| 5,566,072 A * | 10/1996 | Momose | ................. | B60T 8/174 701/117 |
| 6,438,472 B1 * | 8/2002 | Tano | ..................... | G01C 21/26 701/25 |
| 7,079,927 B1 * | 7/2006 | Tano | ..................... | G01C 21/26 701/25 |
| 7,389,178 B2 * | 6/2008 | Raz | ........................ | G07C 5/085 340/903 |
| 8,140,358 B1 * | 3/2012 | Ling | ..................... | G06Q 40/08 705/4 |
| 8,269,617 B2 * | 9/2012 | Cook | ..................... | G07C 5/085 340/439 |
| 9,569,984 B2 * | 2/2017 | Stankoulov | .......... | G09B 19/167 |
| 9,898,936 B2 * | 2/2018 | Stankoulov | .......... | G09B 19/167 |
| 9,938,908 B2 * | 4/2018 | Li | ........................... | F02D 11/02 |
| 2010/0209888 A1 * | 8/2010 | Huang | .................. | B60W 40/09 434/65 |
| 2011/0205045 A1 * | 8/2011 | Pilutti | ..................... | B60Q 1/52 340/441 |
| 2013/0103230 A1 * | 4/2013 | Suganuma | ............. | G06F 17/00 701/1 |

(Continued)

*Primary Examiner* — Tyler J Lee
(74) *Attorney, Agent, or Firm* — Norton Rose Fulbright US LLP; Gerard Messina

(57) ABSTRACT

A method for processing at least one parameter of a trip or an event of a vehicle for a vehicle. The method includes at least one step of reading in, one step of mapping and one step of providing. In the step of reading in, a driving parameter signal is read in, which represents at least the parameter of the trip or of the event of the vehicle. In the step of mapping, the driving parameter signal is mapped by using a linear representation in order to obtain mapped driving parameter coefficients. In the step of providing, the mapped driving parameter coefficients are provided.

12 Claims, 4 Drawing Sheets

(56) References Cited

U.S. PATENT DOCUMENTS

| | | | | |
|---|---|---|---|---|
| 2013/0261966 A1* | 10/2013 | Wang | ............. | G01C 21/3469 |
| | | | | 701/533 |
| 2014/0162219 A1* | 6/2014 | Stankoulov | ......... | G09B 19/167 |
| | | | | 434/65 |
| 2014/0257592 A1* | 9/2014 | Fernandes | ........... | G08G 5/0039 |
| | | | | 701/1 |
| 2015/0088335 A1* | 3/2015 | Lambert | ............. | G08G 1/162 |
| | | | | 701/1 |
| 2015/0246654 A1* | 9/2015 | Tadic | ................ | B60W 40/09 |
| | | | | 340/436 |
| 2016/0189544 A1* | 6/2016 | Ricci | ................. | G07C 5/008 |
| | | | | 701/117 |
| 2017/0148350 A1* | 5/2017 | Stankoulov | ......... | G09B 19/167 |
| 2017/0267252 A1* | 9/2017 | Park | ................. | B60W 30/12 |

* cited by examiner

METHOD AND DEVICE FOR PROCESSING AT LEAST ONE PARAMETER OF A TRIP OR AN EVENT OF A VEHICLE FOR A VEHICLE

CROSS REFERENCE

The present application claims the benefit under 35 U.S.C. § 119 of German Patent Application No. DE 102016213346.2 filed on Jul. 21, 2016, which is expressly incorporated herein by reference in its entirety.

FIELD

The present invention relates to a device, a method and a computer program.

BACKGROUND INFORMATION

Field data of vehicles are used not only for product optimization, but in part also show much potential in the area of the Internet of things. Data are detected in vehicles via sensors or as software variables and are usually stored in control units in the vehicle in order then to read them out via diagnostic or other communication interfaces for processing. The available data volume is limited in this context by a storage space in the control unit (abbreviated: ECU) and by an available transmission volume, e.g. of an ESP system. In contrast to consumer hardware, storage space is here still comparatively expensive. It is an ongoing optimization problem to prune the available information sufficiently in order to conserve storage space, and yet to keep the relevant information as much as possible.

SUMMARY

In accordance with the present invention, a method is provided for processing at least one parameter of a trip or event of a vehicle, furthermore a device and a computer program which use this method. Advantageous developments and improvements of the device are described herein.

A method is provided for processing at least one parameter of a trip or an event of a vehicle for a vehicle. The method includes at least one step of reading in, one step of mapping and one step of providing. In the step of reading in, a driving parameter signal is read in, which represents at least the parameter of the trip or event of the vehicle. In the step of mapping, the driving parameter signal is mapped by using a linear representation in order to obtain mapped driving parameter coefficients. In the step of providing, the mapped driving parameter coefficients are provided.

The parameter may represent for example at least one event occurring during the trip of the vehicle or a sequence of events occurring during at least one trip of the vehicle.

The method presented here makes it possible to transform at least one driving parameter signal into driving parameter coefficients by mapping using the linear representation. The driving parameter coefficients thus produced subsequently require much less storage space in a storage device than the original driving parameter signal.

According to one specific embodiment, the method may additionally include a step of the further reading in of another driving parameter signal, which represents at least one additional parameter of a trip or event of the vehicle, a step of the further mapping of the additional driving parameter signal by using the or one additional linear representation, in order to obtain additional mapped driving parameter coefficients, a step of the further provision of the additional mapped driving parameter coefficients and a step of combining the mapped driving parameter coefficients and the additional mapped driving parameter coefficient to form a driving parameter set.

In order to store the driving parameter coefficients or the driving parameter set, the method may include a step of storing the driving parameter coefficients or the driving parameter set in a storage device of the vehicle. Advantageously, the stored data may be read out subsequently for example for diagnostic purposes.

In the step of combining, it is possible to add up the mapped driving parameter coefficients and the additional mapped driving parameter coefficients to form the driving parameter set. Such a procedure is easily implemented.

According to one specific embodiment, the method may include a step of detecting, in which the at least one parameter of the trip or the event of the vehicle is detected by using a vehicle sensor. For this purpose, known sensors may be used.

To determine the driving parameter signal, the method may include a step of characterizing, in which the at least one parameter of the trip or the event of the vehicle is characterized. For this purpose, predetermined characterization properties may be used such as predetermined deceleration values or velocity values, for example.

In the step of reading in a driving parameter signal, it is possible to read in a driving parameter signal, in which the additional parameter represents for example a number of braking actions over deceleration intensity and/or a velocity and/or a braking time. Accordingly, in the step of reading in an additional driving parameter signal, it is possible to read in an additional driving parameter signal, in which the additional parameter represents for example a number of braking actions over deceleration intensity and/or a velocity and/or a braking time. In this manner, it is possible for the parameter to map relevant events.

In the step of mapping, it is possible to represent the driving parameter signal by using a linear representation, for example a Fourier transform and/or a Z transform and/or a Hermite function. It is thus possible to use known functions.

This method may be implemented for example in software or hardware or in a mixed form of software and hardware for example in a control unit.

The approach presented here furthermore creates a device which is designed to carry out, control or implement the steps of a variant of a method presented here in corresponding devices. This embodiment variant of the approach in the form of a device makes it possible to attain the objective, on which the present approach is based, quickly and efficiently.

For this purpose, the device may include at least one processing unit for processing signals or data, at least one storage unit for storing signals or data, at least one interface to a sensor or an actuator for reading in sensor signals from the sensor or for outputting data or control signals to the actuator and/or at least one communication interface for reading in or outputting data that are embedded in a communication protocol. The processing unit may be for example a signal processor, a microcontroller or the like, it being possible for the storage unit to be for example a flash memory, an EEPROM or a magnetic storage unit. The communication interface may be designed to read in or output data wirelessly and/or in line-bound fashion, it being possible for a communication interface, which is able to read in or output data in line-bound fashion, to read in these data for example electrically or optically from a corresponding data transmission line or to output these data in a corresponding data transmission line.

In the present case, a device may be understood to refer to an electrical device which processes sensor signals and outputs control signals and/or data signals as a function thereof. The device may include an interface developed in the form of hardware and/or software. In a hardware implementation, the interfaces may be part of a so-called system ASIC, for instance, which includes a wide variety of functions of the device. However, it is also possible for the interfaces to be separate, integrated circuits or to be at least partially made up of discrete components. In a software development, the interfaces may be software modules which, for example, are present on a microcontroller in addition to other software modules.

In one advantageous development, the device controls a method for processing at least one parameter of a trip or event of a vehicle. For this purpose, the device may use sensor signals such as a driving parameter signal for example. Control is exercised via actuators such as a read-in device, a mapping device and a provision device.

A computer program product or computer program having program code is also advantageous, which may be stored on a machine-readable carrier or storage medium such as a semiconductor memory, a hard-disk memory or an optical memory, and which is used to carry out, implement and/or control the steps of the method according to one of the specific embodiments described above, in particular when the program product or program is run on a computer or a device.

Exemplary embodiments of the approach presented here are shown in the figures and explained in more detail below.

DETAILED DESCRIPTION OF EXAMPLE EMBODIMENTS

Figure 1:
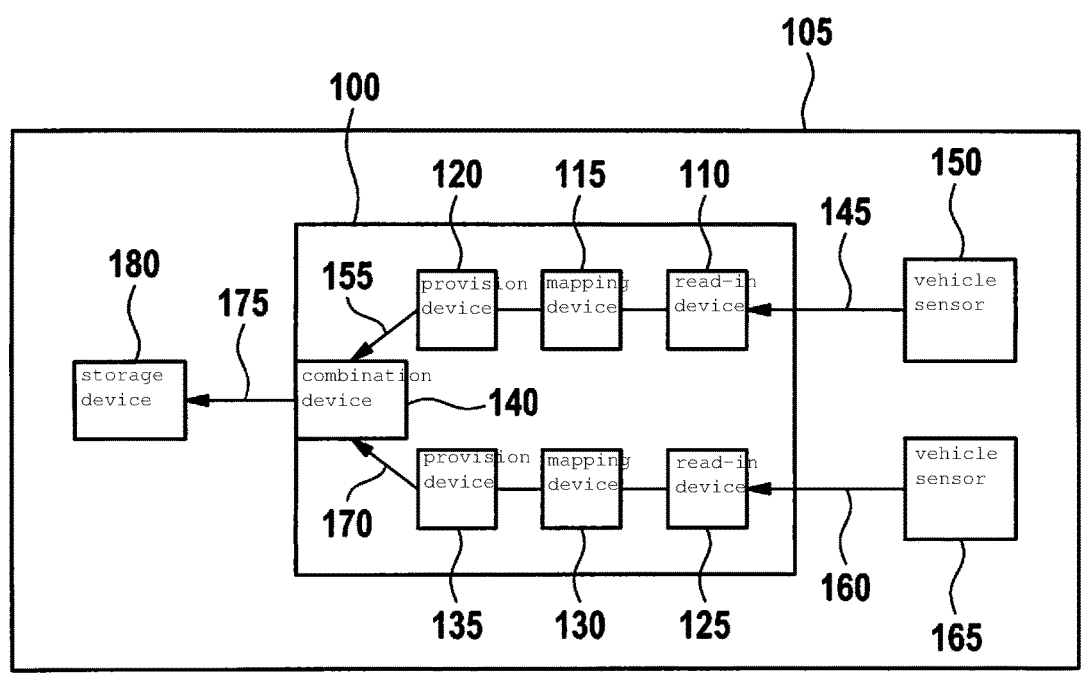
FIG. 1 shows a block diagram of a device for processing at least one parameter of a trip or an event of a vehicle according to one exemplary embodiment.

In the following description of advantageous exemplary embodiments of the present approach, the same or similar reference numerals are used for similarly acting elements shown in the various figures, a repeated description of these elements being dispensed with.

FIG. 1 shows a block diagram of a device 100 for processing at least one parameter of a trip or an event of a vehicle 105 according to one exemplary embodiment. According to this exemplary embodiment, device 100 is situated on vehicle 105 and includes a read-in device 110, a mapping device 115 and a provision device 120. Optionally, device 100 according to this exemplary embodiment furthermore includes an additional read-in device 125, and additional mapping device 130, an additional provision device 135 and a combination device 140.

Read-in device 110 is designed to read in a driving parameter signal 145 that represents at least the parameter of the trip or of an event of vehicle 105. According to this exemplary embodiment, vehicle 105 has a vehicle sensor 150, which is designed to detect the at least one parameter and to provide it for the read-in device 110. Mapping device 115 is designed to map driving parameter signal 145 by using a linear representation in order to obtain mapped driving parameter coefficients 155. The provision device 120 is designed to provide the mapped driving parameter coefficients 155.

According to this exemplary embodiment, the additional read-in device 125 is designed to read in an additional driving parameter signal 160 that represents at least one additional parameter of a trip or of an event of vehicle 105. For this purpose, vehicle 105 has an additional vehicle sensor 165, which is designed to detect at least the additional parameter of the trip or of an event of vehicle 105 and to provide it for the additional read-in device 125. The additional mapping device 130 is designed to map the additional driving parameter signal 160 by using the or an additional linear representation in order to obtain additional mapped driving parameter coefficients 170. The additional provision device 135 is designed to provide the additional mapped driving parameter coefficients 170. According to this exemplary embodiment, the combination device 140 is designed to combine the mapped driving parameter coefficients 155 and the additional mapped driving parameter coefficients 170 into a driving parameter set 175. According to this exemplary embodiment, vehicle 105 has a storage device 180, which is designed to store driving parameter set 175.

According to an alternative exemplary embodiment, device 100 only has the described read-in device 110, mapping device 115 and provision device 120. Storage device 180 is in this case designed to store the mapped driving parameter coefficients 155.

According to this exemplary embodiment, read-in device 110 is designed to read in a driving parameter signal 145, in which the parameter represents a number of braking actions over deceleration intensity and/or a velocity and/or a braking time of vehicle 105 during the trip or an event. According to this exemplary embodiment, the additional read-in device 125 is designed to read in an additional driving parameter signal 160, in which the additional parameter represents a number of braking actions over deceleration intensity and/or a velocity and/or a braking time of vehicle 105 during the trip. According to this exemplary embodiment, mapping device 115 is designed to map driving parameter signal 145 and the additional mapping device 130 is designed to map the additional driving parameter signal 160 by using a linear representation formed as a Fourier transform and/or a Z transform and/or a Hermite function.

Device 100 is described again in more detail in the following: Driving parameter signal 150 and additional driving parameter signal 160, which may also be designated relevant data, are empirical distributions of events, times, etc. over one- or multi-dimensional characteristics, e.g., the number of braking actions over deceleration intensity and/or the speed and/or the braking time of vehicle 105. At the time of the definition, however, it is often not clear in what granularity and in what detail the driving parameter signal 145 and the additional driving parameter signal 160 will later be relevant. Also, in the software, it is possible for relevant events to be identified, characterized and represented in histograms. Since the classification of the histograms must be defined in advance, later relevant details often remain hidden in the data, e.g. due to a lack of granularity in small numbers. A conventional approach, for example, assumes for the empirical distribution various distribution functions and records the characteristic variables of these distribution functions. Experience shows however, that many variables do not follow a traditional distribution function, but over time are subject to many influencing factors and use cases such that inter alia due to superpositions an inhomogeneous behavior is observed, which possibly requires more complex representations.

The device 100 described here, by contrast, allows for a maximization of relevant information in a given storage volume by an alternative representation of the data in the format least of driving parameter signal 145 on the basis of linear representations. Examples for linear representations are discrete Fourier transforms, abbreviated: FFT, Z transforms or a fractionation according to Hermite functions. For this purpose, the contributions of the coefficients in the form of the driving parameter coefficients 155 of a defined linear representation are calculated for each event or continuously in the ECU and are correspondingly incremented. An inverse transformation may occur in the processing of the data.

For many cases of application, the alternative representation on the basis of suitable linear representations of driving parameter signals 145, 160 makes it possible, in the event of fixed storage space, to preserve more information or to extract more information afterwards, e.g. detailed curves and/or inhomogeneities. This results in a great additional benefit when using field data.

Figure 2:
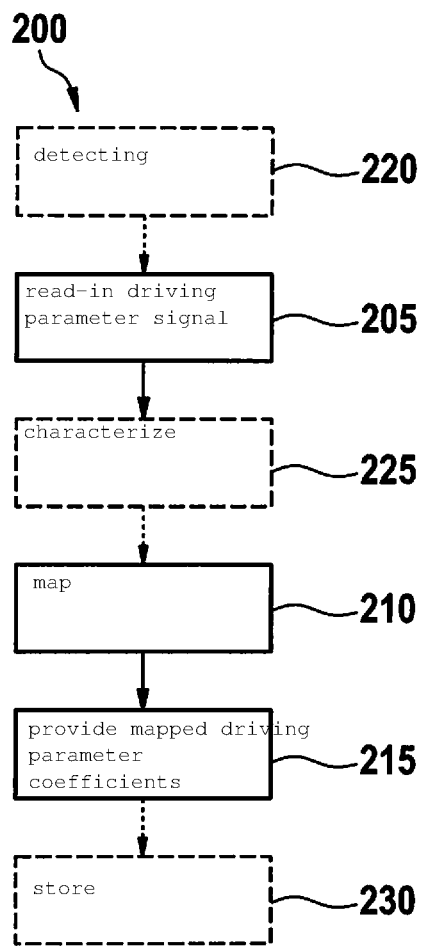
FIG. 2 shows a flow chart of a method for processing at least one parameter of a trip or event of a vehicle according to one exemplary embodiment.

FIG. 2 shows a flow chart of a method 200 for processing at least one parameter of a trip or an event of a vehicle according to one exemplary embodiment. This may be a method 200 that is able to be implemented by the device described in FIG. 1. In a step 205 of reading in, a driving parameter signal is read in, which represents at least the parameter of the trip or of the event of the vehicle. In a step of mapping, the driving parameter signal is mapped by using a linear representation in order to obtain mapped driving parameter coefficients. In a step 215 of providing, the mapped driving parameter coefficients are provided.

The method 200 may also be called a method for using linear representations for the effective detection of field data.

According to this exemplary embodiment, method 200 optionally has a step 220 of detecting, a step 225 of characterizing and a step 230 of storing. In the step 220 of detecting, the at least one parameter of the drive of the vehicle is detected by using a vehicle sensor. In the step 225 of characterizing, the at least one parameter of the drive of the vehicle is characterized in order to determine the driving parameter signal. In the step 230 of storing, the driving parameter coefficients or the driving parameter set are stored in a storage device of the vehicle.

Figure 3:
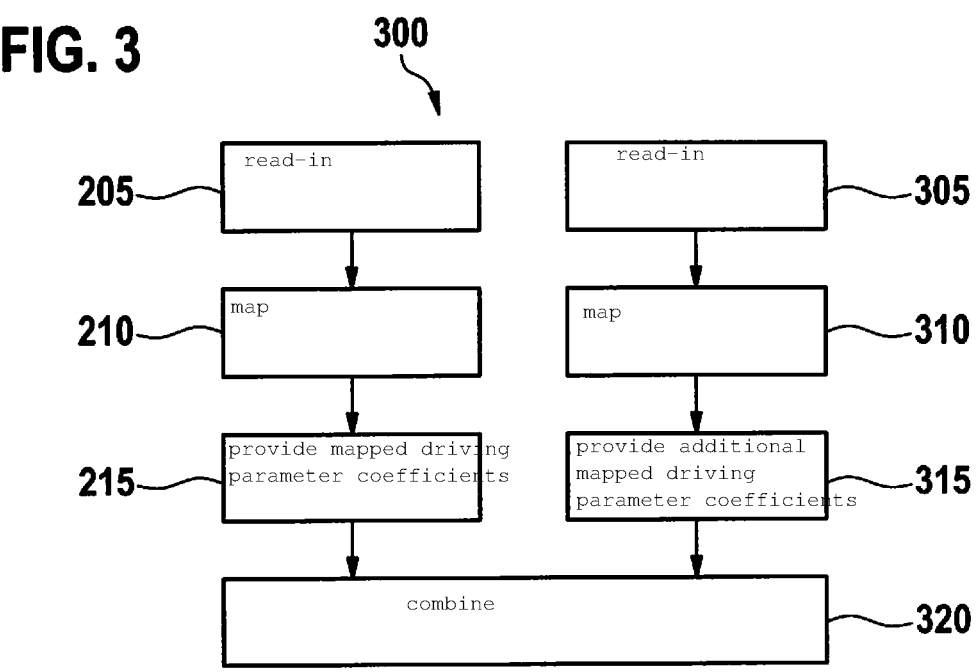
FIG. 3 shows a flow chart of a method for processing at least one parameter of a trip or event of a vehicle according to one exemplary embodiment.

FIG. 3 shows a flow chart of a method 300 for processing at least one parameter of a trip of a vehicle according to one exemplary embodiment. This may be the method 200 described in FIG. 2 without the optional steps, but with additional steps.

In a step 305 of the additional reading in, an additional driving parameter signal is read in, which represents at least one additional parameter of a trip of the vehicle. In a step 310 of additional mapping, the additional driving parameter signal is mapped by using the or an additional linear representation in order to obtain additional mapped driving parameter coefficients. In a step 315 of the additional providing, the additional mapped driving parameter coefficients are provided. In a step 320 of combining, the mapped driving parameter coefficients and the additional mapped driving parameter coefficients are combined into a driving parameter set.

In step 320 of combining, it is possible to add up the mapped driving parameter coefficients and the additional mapped driving parameter coefficients to form the driving parameter set.

Figure 4:
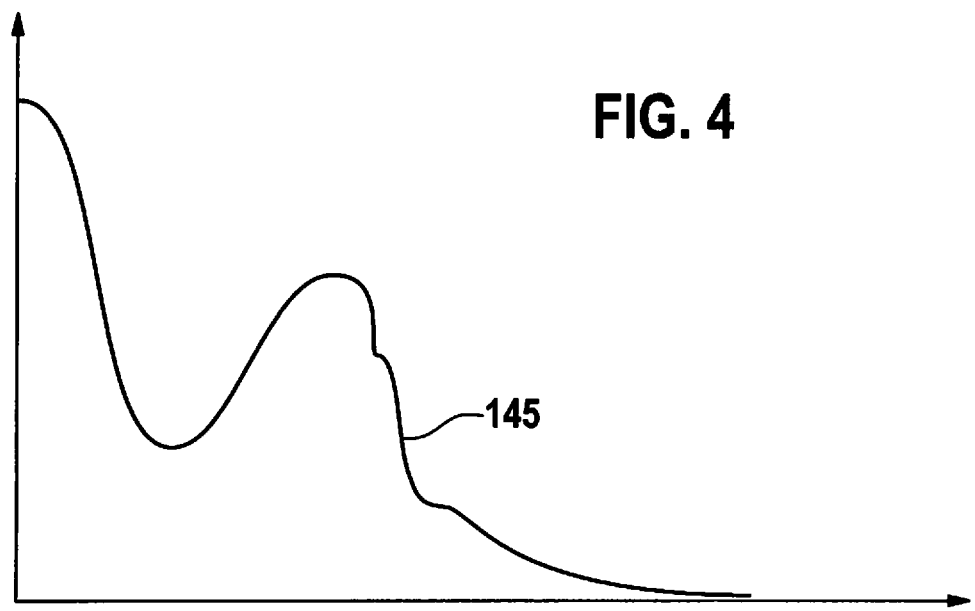
FIG. 4 shows a schematic representation of an empirical distribution of a driving parameter signal according to one exemplary embodiment.

FIG. 4 shows a schematic representation of an empirical distribution of a driving parameter signal 145 according to one exemplary embodiment. This may be the driving parameter signal 145 described with reference to the preceding figures. The driving parameter signal 145 in this case represents complete information at unlimited storage capacity.

Figure 5:
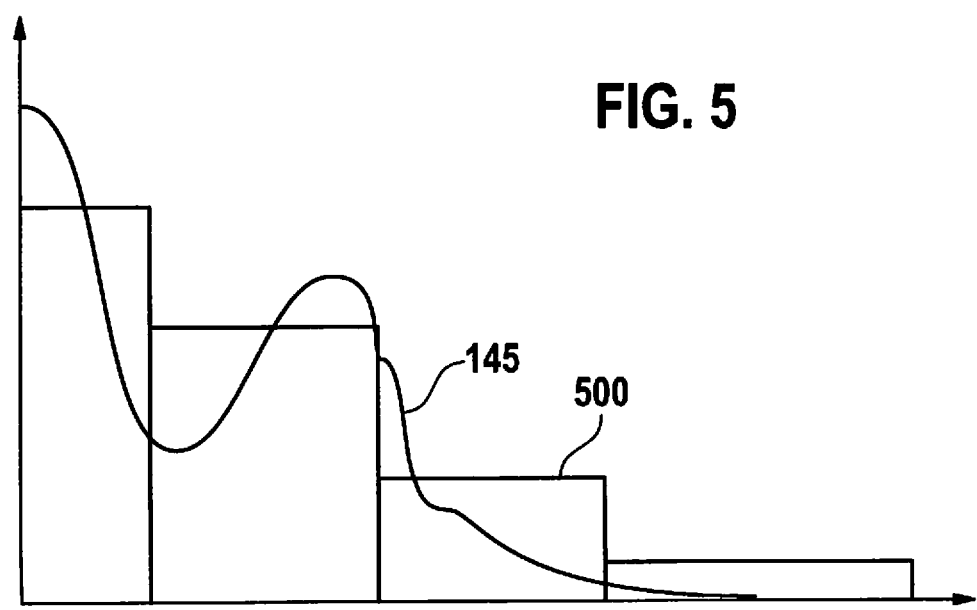
FIG. 5 shows a schematic representation of a driving parameter signal and of a driving parameter signal with the aid of a histogram having few intervals according to one exemplary embodiment.

FIG. 5 shows a schematic representation of a driving parameter signal 145 of a driving parameter signal with the aid of a histogram 500 having few intervals according to one exemplary embodiment. This may be the complete driving parameter signal 145 represented in FIG. 4, which is compared to the representation with the aid of histogram 500.

Figure 6:
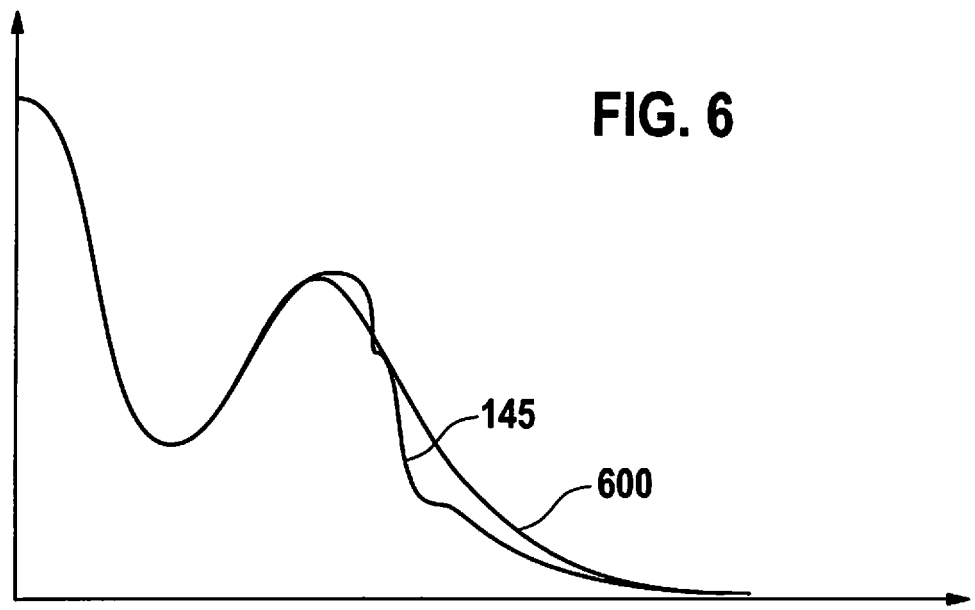
FIG. 6 shows a schematic representation of a driving parameter signal and of a driving parameter signal with the aid of few coefficients from Hermite polynomials according to one exemplary embodiment.

FIG. 6 shows a schematic representation of a driving parameter signal 145 and of a driving parameter signal with the aid of a few coefficients from Hermite polynomials 600 according to one exemplary embodiment. This may be the complete driving parameter signal 145 represented in FIG. 4, which is compared to the representation with the aid of the coefficients from Hermite polynomials 600.

Figure 7:
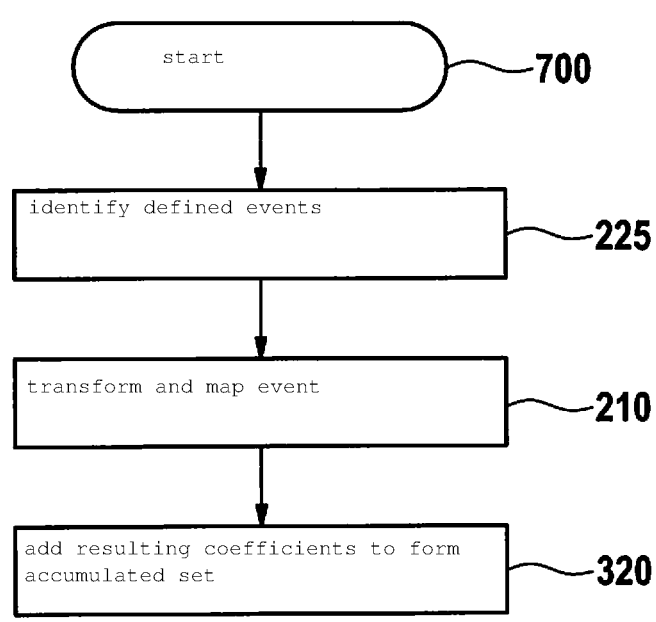
FIG. 7 shows an segment of a flow chart of a method for processing at least one parameter of a trip or event of a vehicle according to one exemplary embodiment.

FIG. 7 shows a segment of a flow chart of a method 700 for processing at least one parameter of a trip of a vehicle according to one exemplary embodiment. Steps 225, 210 and 320 may be the steps described in FIGS. 2 and 3, which are explained here in more detail.

In step 225, continuous or discrete, but defined events are identified in the form of driving parameter signals by an ECU in the form of the device and are characterized with respect to relevant properties, e.g. a braking action at 0.5 g deceleration for 2 seconds at 2 km/h and/or a current velocity of 120 km/h for example. In step 210, the event is transformed and mapped in every dimension by the previously defined linear representation.

In step 320, the resulting coefficients in the form of the driving parameter coefficients of the individual transformations are added up to form an accumulated set, that is, the driving parameter set. The accumulated set may then be retrieved via a retrieval interface and reflects an empirical distribution function of the events via the property attributes.

If an exemplary embodiment includes an "and/or" linkage between a first feature and a second feature, this is to be understood to mean that the exemplary embodiment according to one specific embodiment has both the first feature as well as the second feature, and according to another specific embodiment, either has only the first feature or only the second feature.

What is claimed is:

1. A method for processing at least one parameter of a trip of a vehicle or of an event occurring during the trip of the vehicle, the method comprising:

reading in a driving parameter signal which represents at least the parameter of one: (i) of the trip of the vehicle, or (ii) of an event occurring during the trip of the vehicle;
mapping the driving parameter signal by using a linear representation to obtain mapped driving parameter coefficients;
providing the mapped driving parameter coefficients, wherein the parameter represents at least one of: (i) a number of braking actions over deceleration intensity, and (ii) a braking time;
further reading in another driving parameter signal which represents at least one additional parameter one of: (i) of a trip of the vehicle, or (ii) of an event occurring during the trip of the vehicle;
further mapping of the additional driving parameter signal by using at least one additional linear representation to obtain additional mapped driving parameter coefficients;
further providing the additional mapped driving parameter coefficients; and
combining the mapped driving parameter coefficients and the additional mapped driving parameter coefficients to form a driving parameter set;
wherein in the combining, the mapped driving parameter coefficients and the additional mapped driving parameter coefficients are added up to form the driving parameter set, and
wherein the driving parameter set is retrievable via a retrieval interface and reflects an empirical distribution function of the events via the property attributes.

2. The method as recited in claim 1, further comprising: storing the driving parameter coefficients or the driving parameter set in a storage device of the vehicle.

3. The method as recited in claim 1, further comprising: detecting the at least one parameter by using a vehicle sensor.

4. The method as recited in claim 1, further comprising: characterizing the at least one parameter to determine the driving parameter signal.

5. The method as recited in claim 1, wherein the additional parameter represents at least one of: (i) a number of braking actions over deceleration intensity, and (ii) a braking time.

6. The method as recited in claim 1, wherein, in the mapping, the driving parameter signal is mapped by using at least one of: (i) a Fourier transform, (ii) a Z transform, and (iii) a Hermite function.

7. A device for processing at least one parameter of a trip of a vehicle or of an event occurring during the trip of the vehicle, comprising:
a non-transitory machine-readable storage medium on which is stored a computer program, which is executable by a processor, including a program code arrangement having program code for processing at least one parameter of a trip of a vehicle or of an event occurring during the trip of the vehicle, by performing the following:
reading in a driving parameter signal which represents at least the parameter of one: (i) of the trip of the vehicle, or (ii) of an event occurring during the trip of the vehicle;
mapping the driving parameter signal by using a linear representation to obtain mapped driving parameter coefficients;
providing the mapped driving parameter coefficients, wherein the parameter represents at least one of: (i) a number of braking actions over deceleration intensity, and (ii) a braking time;
further reading in another driving parameter signal which represents at least one additional parameter one of: (i) of a trip of the vehicle, or (ii) of an event occurring during the trip of the vehicle;
further mapping of the additional driving parameter signal by using at least one additional linear representation to obtain additional mapped driving parameter coefficients;
further providing the additional mapped driving parameter coefficients; and
combining the mapped driving parameter coefficients and the additional mapped driving parameter coefficients to form a driving parameter set;
wherein in the combining, the mapped driving parameter coefficients and the additional mapped driving parameter coefficients are added up to form the driving parameter set, and
wherein the driving parameter set is retrievable via a retrieval interface and reflects an empirical distribution function of the events via the property attributes.

8. The device as recited in claim 7, wherein the additional parameter represents at least one of: (i) a number of braking actions over deceleration intensity, and (ii) a braking time.

9. The device as recited in claim 7, wherein, in the mapping, the driving parameter signal is mapped by using at least one of: (i) a Fourier transform, (ii) a Z transform, and (iii) a Hermite function.

10. A non-transitory machine-readable storage medium on which is stored a computer program, which is executable by a processor, comprising:
a program code arrangement having program code for processing at least one parameter of a trip of a vehicle or of an event occurring during the trip of the vehicle, by performing the following:
reading in a driving parameter signal which represents at least the parameter of one: (i) of the trip of the vehicle, or (ii) of an event occurring during the trip of the vehicle;
mapping the driving parameter signal by using a linear representation to obtain mapped driving parameter coefficients; and
providing the mapped driving parameter coefficients wherein the parameter represents at least one of: (i) a number of braking actions over deceleration intensity, and (ii) a braking time;
further reading in another driving parameter signal which represents at least one additional parameter one of: (i) of a trip of the vehicle, or (ii) of an event occurring during the trip of the vehicle;
further mapping of the additional driving parameter signal by using at least one additional linear representation to obtain additional mapped driving parameter coefficients;
further providing the additional mapped driving parameter coefficients; and
combining the mapped driving parameter coefficients and the additional mapped driving parameter coefficients to form a driving parameter set;
wherein in the combining, the mapped driving parameter coefficients and the additional mapped driving parameter coefficients are added up to form the driving parameter set, and
wherein the driving parameter set is retrievable via a retrieval interface and reflects an empirical distribution function of the events via the property attributes.

11. The machine-readable storage medium as recited in claim 10, wherein the additional parameter represents at least one of: (i) a number of braking actions over deceleration intensity, and (ii) a braking time.

12. The machine-readable storage medium as recited in claim 10, wherein, in the mapping, the driving parameter signal is mapped by using at least one of: (i) a Fourier transform, (ii) a Z transform, and (iii) a Hermite function.

* * * * *